United States Patent
Subramaniyan et al.

(10) Patent No.: US 9,978,114 B2
(45) Date of Patent: May 22, 2018

(54) SYSTEMS AND METHODS FOR OPTIMIZING GRAPHICS PROCESSING FOR RAPID LARGE DATA VISUALIZATION

(71) Applicant: General Electric Company, Schenectady, NY (US)

(72) Inventors: Arun Karthi Subramaniyan, Clifton Park, NY (US); Alexandre Nikolov Iankoulski, Niskayuna, NY (US); Renato Giorgiani do Nascimento, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 120 days.

(21) Appl. No.: 14/985,967

(22) Filed: Dec. 31, 2015

(65) Prior Publication Data

US 2017/0193629 A1 Jul. 6, 2017

(51) Int. Cl.
*G06T 1/20* (2006.01)
*G06T 1/60* (2006.01)

(52) U.S. Cl.
CPC . *G06T 1/20* (2013.01); *G06T 1/60* (2013.01)

(58) Field of Classification Search
CPC ................................. G06T 1/20; G06T 1/60
See application file for complete search history.

(56) References Cited

U.S. PATENT DOCUMENTS

| | | | |
|---|---|---|---|
| 6,615,211 B2 | 9/2003 | Beygelzimer et al. | |
| 7,277,838 B2 | 10/2007 | Volponi et al. | |
| 7,667,702 B2 * | 2/2010 | Vion-Dury | G06T 11/203 345/441 |
| 7,742,904 B2 | 6/2010 | Healy et al. | |

(Continued)

FOREIGN PATENT DOCUMENTS

| | | |
|---|---|---|
| CN | 102788955 A | 11/2012 |
| CN | 104166787 A | 11/2014 |

(Continued)

OTHER PUBLICATIONS

Marchesin et al., Dynamic Load Balancing for Parallel Volume Rendering, Dec. 2006, pp. 1-8.*

(Continued)

*Primary Examiner* — Robert Craddock
(74) *Attorney, Agent, or Firm* — Nitin N. Joshi (57) ABSTRACT

A system for optimizing processing and display of large datasets is provided. The system includes a graphics processing and optimization (GPO) computing device. The GPO computing device is configured to store a dataset including a data point in a memory device, select the data point to display on a display device based on a first display request signal received via a user interface, and accelerate graphical processing of the dataset using optimization algorithms, wherein the GPO computing device is configured to assign a worker process to execute on the data point, The GPO computing device is also configured to convert the data point into a renderable graphics component, and generate a least-compute intensive representation of the data point, and cause the user interface to display a graphical representation of a first subset of the data including the renderable graphics component at a first display resolution.

24 Claims, 5 Drawing Sheets

(56) References Cited

U.S. PATENT DOCUMENTS

| | | | |
|---|---|---|---|
| 7,940,271 B2* | 5/2011 | Wright | G06F 17/30554 345/428 |
| 8,050,843 B2 | 11/2011 | Von Hoff et al. | |
| 8,712,739 B2 | 4/2014 | Jiang et al. | |
| 8,996,978 B2 | 3/2015 | Richstein et al. | |
| 2002/0105679 A1* | 8/2002 | Haynes | G06T 1/0064 358/3.28 |
| 2004/0102937 A1 | 5/2004 | Ibrahim | |
| 2005/0108256 A1 | 5/2005 | Wakefield et al. | |
| 2012/0330465 A1 | 12/2012 | O'Neill et al. | |
| 2014/0250153 A1 | 9/2014 | Nixon et al. | |
| 2014/0375650 A1 | 12/2014 | Grundstrom et al. | |
| 2015/0116318 A1 | 4/2015 | Obrien et al. | |
| 2017/0193381 A1 | 7/2017 | Subramaniyan et al. | |
| 2017/0193460 A1 | 7/2017 | Subramaniyan et al. | |

FOREIGN PATENT DOCUMENTS

| | | |
|---|---|---|
| CN | 102788955 B | 2/2015 |
| WO | 0137072 A1 | 5/2001 |

OTHER PUBLICATIONS

Zhang et al., Streamlining GPU Applications on the Fly, Jun 4, 2010, 115-125.*

Bowyer et al.,"A parallel decision tree builder for mining very large visualization datasets",Systems, Man, and Cybernetics, 2000 IEEE International Conference on, Oct. 8-11, 2000,pp. 1888-1893 vol. 3.
Sekhar et al.,"Data Mining for Selective Visualization of Large Spatial Datasets", Tools with Artificial Intelligence, 2002. (ICTAI 2002). Proceedings. 14th IEEE International Conference on, 2002,pp. 41-48.
R. E. Kalman, "A New Approach to Linear Filtering and Prediction Problems", Journal of Fluids Engineering, vol. No. 82 , Issue No. 1, pp. 35-45, Mar. 1, 1960.
Hoshiya et al., "Structural Identification by Extended Kalman Filter", Journal of Engineering Mechanics, vol. No. 110, Issue No. 12, pp. 1757-1770, Dec. 1984.
Julier et al., "Unscented Filtering and Nonlinear Estimation", Proceedings of the IEEE, vol. No. 92, Issue No. 3, pp. 401-422, Mar. 2004.
Daum, "Nonlinear filters: beyond the Kalman filter", Aerospace and Electronic Systems Magazine, IEEE, vol. No. 20, Issue No. 8, pp. 57-69, Aug. 2005.
Blanchard et al., "Parameter Estimation Method using an Extended Kalman Filter", Proceedings of the Joint North America, Asia-Pacific ISTVS Conference and Annual Meeting of Japanese Society for Terramechanics, Fairbanks, Alaska, USA, pp. 1-14, Jun. 23-26, 2007.
Kandepu et al., "Applying the unscented Kalman filter for nonlinear state estimation", Journal of Process Control, ScienceDirect, vol. No. 18, Issue No. 7-8, pp. 753-768, Aug.-Sep. 2008.
IN Application No. 201641009626 dated Mar. 18, 2016.

* cited by examiner

SYSTEMS AND METHODS FOR OPTIMIZING GRAPHICS PROCESSING FOR RAPID LARGE DATA VISUALIZATION

BACKGROUND

The field of the disclosure relates generally to methods for optimizing the processing and graphical display of data. More specifically, the present disclosure relates to systems and methods to enable rapid visualization of very large datasets with minimal computing capability.

Extremely large datasets are generated as a result of many technological activities. For example, component testing for a large set of components and test cases may result in a massive dataset containing millions or even billions of rows. Sensor data from a large set of machines in an industrial location may encompass hundreds of variables and over time may reach terabytes of data. Moreover, industrial data is typically heterogeneous, with a mixed collection of numbers and strings and several missing or corrupted data points. Analysts spend a significant portion of their time cleaning and preprocessing datasets before they can even be displayed. Additionally, displaying large datasets (such as on a computer display) becomes difficult or even impossible if the dataset is too large, because the computing power is insufficient to properly render a large amount of data or to quickly determine what subset of data the user selected for display, out of the larger mass. It can be similarly cumbersome to determine what portions of data are missing and where data is erroneous.

As such, it may be difficult to simply load and review a large dataset without distributing subsections of the data across multiple processors and employing complex parallel processing techniques. Such techniques also suffer from a lack of synchronicity and coordination between the various processors, primarily because there may not be a scalable algorithm that can exhibit massive parallelism on the scale required. Importantly, users frequently can review only one screen's worth of visual data at a time, yet computer processors process the entire dataset at all times, thereby starving the processor of needed power to render the data that is requested for the screen. Even for data that is on the screen, known processors slow down due to a methodology that requires them to process and render every pixel, whether it is a data point or not. The non-data point pixels are irrelevant to the user, but rendering them consumes processing power that is valuable when rendering massive datasets.

BRIEF DESCRIPTION

In one aspect, a system for optimizing processing and display of datasets is provided. The system includes a memory device, a user interface including a display device, and a graphics processing and optimization (GPO) computing device coupled with the memory device and communicatively coupled to the user interface. The GPO computing device is configured to store a dataset including at least one data point in the memory device. The GPO computing device is also configured to select the at least one data point to display on the display device based on a first display request signal received via the user interface. The GPO computing device is further configured to accelerate graphical processing of the dataset using one or more enhancement algorithms, further including assigning a worker process to execute on the at least one data point. The GPO computing device is also configured to convert the at least one data point into a renderable graphics component, further including generating a least-pixel representation of the at least one data point. The GPO computing device is further configured to cause the user interface to display a graphical representation of a first subset of the data including the renderable graphics component at a first display resolution.

In another aspect, a method for optimizing processing and display of datasets is provided. The method is implemented using a graphics processing and optimization (GPO) computing device in communication with a memory device and a processor. The method includes storing a dataset including at least one data point in the memory device. The method also includes selecting the at least one data point to display on the display device based on a first display request signal received via the user interface. The method further includes accelerating graphical processing of the dataset using one or more enhancement algorithms, further including assigning a worker process to execute on the at least one data point. The method also includes converting the at least one data point into a renderable graphics component, further including generating a least-pixel representation of the at least one data point. The method further includes causing the user interface to display a graphical representation of a first subset of the data including the renderable graphics component at a first display resolution.

In yet another aspect, a computer readable medium having computer executable instructions embodied on the computer readable medium for enhancing processing and display of datasets is provided. When executed by a graphics processing and optimization (GPO) computing device including a processor in communication with a memory device, the computer executable instructions cause the GPO computing device to store a dataset including at least one data point in the memory device. The computer executable instructions also cause the GPO computing device to select the at least one data point to display on the display device based on a first display request signal received via the user interface. The computer executable instructions further cause the GPO computing device to accelerate graphical processing of the dataset using one or more enhancement algorithms, further including assigning a worker process to execute on the at least one data point. The computer executable instructions also cause the GPO computing device to convert the at least one data point into a renderable graphics component, further including generating a least-pixel representation of the at least one data point. The computer executable instructions further cause the GPO computing device to cause the user interface to display a graphical representation of a first subset of the data including the renderable graphics component at a first display resolution.

DRAWINGS

These and other features, aspects, and advantages will become better understood when the following detailed description is read with reference to the accompanying drawings in which like characters represent like parts throughout the drawings, where.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the term "computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "computer-readable media" includes all tangible, computer-readable media, including, without limitation, computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the terms "software" and "firmware" are interchangeable, and include any computer program stored in memory for execution by devices that include, without limitation, mobile devices, clusters, personal computers, workstations, clients, and servers.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Computer systems, such as the service life modeling computing device are described, and such computer systems include a processor and a memory. However, any processor in a computer device referred to herein may also refer to one or more processors where the processor may be in one computing device or a plurality of computing devices acting in parallel. Additionally, any memory in a computer device referred to may also refer to one or more memories, where the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor." The term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above are only examples, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an exemplary embodiment, the system is executed on a single computer system, without requiring a connection to a server computer. In a further embodiment, the system is run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

The present disclosure relates to a Graphics Processing and Optimization (GPO) computing device that is, in at least some implementations, used to optimize the processing and display of a very large dataset. For example, the GPO computing device is able to receive a large dataset and quickly determine the portion that is selected for review. The GPO computing device applies one or more algorithms to the dataset to efficiently search for and isolate the selected data such that the GPO computing device can operate using limited hardware or processing power to handle display of the selected data. Furthermore, the GPO computing device applies specific image transformations to the data in order to efficiently render data points. The GPO computing device is also configured to dynamically compress or expand the data-to-pixel map to accommodate all the data on the monitor screen. Depending on the dataset size, the GPO computing device automatically displays a 2-D representation of the data such as density for the user to interact with the data immediately. As the user explores specific regions of the density map, those smaller regions (or tiles) are rapidly rendered by a combination of shape-accelerated representation aided by region mapped sparseness. As the user explores more regions of the dataset, the visual tiles are assembled like a map to generate a landscape of the region of interest. When computer resources become available, the GPO continues to render the remaining unexplored regions in the background without affecting the user experience.

The GPO computing device is also configured to use a computer's CPU and GPU to process individual variables using algorithms that optimize the rendering volume based on the current capacity of the CPU and page buffer. The GPO computing device is also configured to quickly superimpose time series plots for quick comparison by plotting each individual variable in its own layer or tile and translating the layers for superposition, which is reversible. For example, if the user wants to display points colored based on a separate variable, each unique value in the variable is plotted on a different layer with its own independent parallel worker process. As each worker process completes asynchronously, the page is refreshed so that the user can immediately start visualizing the results rather than waiting for all points to load. The GPO computing device is also configured to determine correlations in large datasets by loading area-aggregated histograms of the data first and then zoom into specific tiles of the histogram based on user interaction. Once a particular tile is zoomed in, the zoomed version of the correlation is also cached so that a tessellated map is created as the user interacts with the correlations. The tessellation process displays a coarse representation of the dataset immediately followed by layers of increasing resolution and contrast as each tile is rendered by an independent worker. This allows the user to visualize the entire dataset immediately followed up with more detailed exploration.

In one embodiment, the GPO computing device employs a graphics processing optimization (GPO) scheduler to enable the functions described above. In one embodiment, the GPO scheduler is a standalone software component including computer-executable instructions for execution on the GPO computing device. Unlike conventional computer processor schedulers, the GPO scheduler causes the GPO computing device to actively detect whether requests for CPU utilization are being received by the CPU. When a request for CPU utilization is detected, the GPO scheduler causes the GPO computing device to slow down or even stop rendering the data visualization so that the incoming request can be processed. The GPO scheduler causes the GPO computing device to determine the number of display pixels on the user's display screen and process only the equivalent amount of data.

In another embodiment, the GPO computing device is configured to determine a quantity of CPU processing capacity required by the incoming request. For example, a user may use a mouse to move a graphical pointer onscreen from one point on the screen to another. The act of moving a mouse may require that CPU usage to increase by 3%. Accordingly, the GPO scheduler may cause the GPO computing device to reduce amount of CPU being used by the dataset visualization process by 3% in order to prevent locking up of the computer screen due to CPU resource exhaustion. In another embodiment, the GPO scheduler may cause the GPO computing device to stop the data visualization. In yet another embodiment, the GPO scheduler may receive the 3% value as input into a scheduling algorithm that outputs a proportional quantity, e.g., 0.3%, by which the GPO computing device is to reduce execution of the data visualization.

In at least some implementations, the GPO computing device is composed of multiple worker processors. In one embodiment, a worker processor is a hardware component subsidiary to or just in communication with the GPO computing device such that the worker processor operates based on commands received from the GPO computing device. In another embodiment, a worker processor is, e.g., and without limitation, a virtual machine, a code routine, an application, an applet, an operating system process, and the like.

Each worker processor is designed to execute on a certain subset of a dataset. For example, the GPO computing device will receive a large dataset from a database or cloud-based data repository. The GPO computing device will determine the size of the dataset and assign a worker processor to begin processing a subset of the dataset. In at least some implementations, if the GPO computing device is configured to contain ten worker processors, each worker processor will be initially configured to execute on a defined 10% of the dataset. This may be only an initial setting. The GPO computing device is configured to receive input from a user or viewer of the dataset to determine how efficiently to render the requested data. In other words, if a user requests a specific portion of the dataset for review, the GPO computing device will target that subset of the dataset for display.

As a worker process processes a subset of the dataset, the GPO computing device is configured to store a process state for the worker process at predetermined time intervals. In one embodiment, process state refers to all the stored information, at a given instant in time, to which the GPO computing device has access. For example, the worker process may process a subsection of the dataset and generate a value for the percentage of the subsection of the dataset rendered, any errors caused, the precise memory locations where rendered and non-rendered portions of the subsection of the dataset are stored, time elapsed, and the like. This process state data may be stored as variables whose value is periodically queried by the GPO computing device. Additionally, specific process state labels may be generated by the worker process itself or assigned by the GPO computing device upon querying of the process state variables. Process state labels may include, e.g., and without limitation, "running", "stopped", "failed", "completed", "waiting", and the like. Process state may be stored on random access memory and continuously retrieved, or may be stored on read-only memory by the GPO computing device.

The GPO computing device will redirect worker processors that are executing on other subsets of the dataset to go and execute on the requested subset of the dataset. Moreover, the GPO computing device is configured to store a state for each worker processor. For example, if the ten worker processors were executing on subsets 1-10, but now the user requested subset 5 such that they are now executing on subset 5, the GPO computing device will save the processing state for each worker processor for each of the other subsets 1-4 and 6-10. This way, when the user wishes to view some other subset of the dataset, the GPO computing device can efficiently reassign worker processors by simply feeding the saved processing state to each worker processor that will now execute on the new subset.

In addition to process optimization, the GPO computing device also enhances the display of data points from the dataset. The GPO computing device uses a variety of image transformation techniques to more efficiently render visualizations of large datasets. In one embodiment, the GPO computing device is configured to receive visualization data, e.g., that certain data points have specific associated shapes, and convert those associated shapes into target shapes that are more efficient to render. For example, certain data points may need to be rendered as particular graphic components, e.g., shapes, in order to distinguish them from other data points (rendered using other graphic components).

More specifically, different components may be used but each may need to be displayed using one or more rectangular pixels. The GPO computing device is configured to generate a least-pixel configuration of each graphic component, and apply an image transformation to that representation in order to properly render it. For example, a circle may be efficiently rendered using two rectangles in a particular offset configuration. Accordingly, the GPO computing device determines whether a particular data point must be displayed as a circle, and generates the least-pixel configuration that will render the circle. This is critical because the savings in transforming a circle to two rectangles could be 100-1000 times less compute-intensive to display large datasets. This is because, to display a circle, the processor has to first compute the center of the circle and then determine which rectangular pixels around the circle it needs to turn on, and at what intensity, to mimic a circle. With two perpendicular rectangles, there is no computation needed—it only needs to turn on, in full, the pixels inside the two rectangles. A star is another case where it can be efficiently displayed with two triangles.

The GPO computing device also develops template displays for datasets in order to quickly display data. In at least some implementations, over time the GPO computing device learns that particular datasets are always displayed or requested for display in particular ways. For example, component testing data may always be requested in a histogram format. The GPO computing device is configured to determine that the incoming dataset contains component testing data and automatically convert it into histogram form for display.

Additionally, the GPO computing device is configured to detect gaps in the incoming dataset. For example, the dataset may have missing rows, missing columns, or just missing data points. As the dataset is being rendered, the GPO computing device also applies its worker processors to alert the user every time a gap in data is encountered. The data gaps are stored as part of processor state, to be accounted for each time a worker processor executes on a particular subset of the dataset. And the data gaps can be exported from the various processing states and collected into a single data gap report that can inform the user as to missing data in the dataset.

Figure 1:
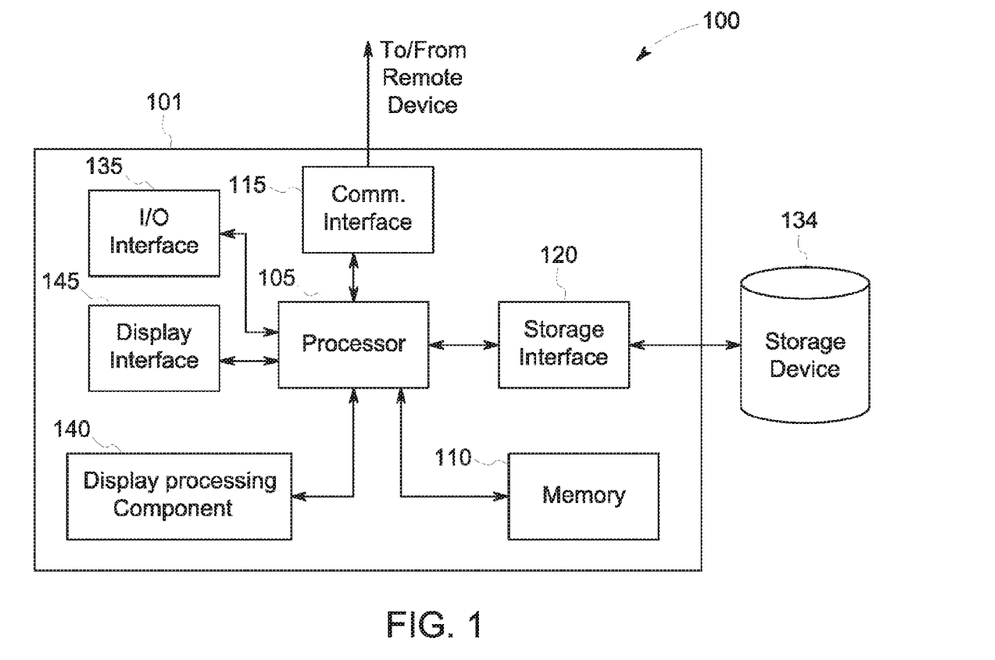
FIG. 1 illustrates an exemplary configuration of a server system, such as an exemplary GPO computing device.

FIG. 1 illustrates an exemplary configuration of a server system 101, such as GPO computing device 100. Server system 101 includes a processor 105, e.g., a central processing unit (CPU) of a computer for executing instructions. Instructions may be stored in a memory area 110, for example. Processor 105 may include one or more processing units, e.g., in a multi-core configuration, for executing instructions. The instructions may be executed within a variety of different operating systems on the server system 101, such as UNIX, LINUX, Microsoft Windows®, etc. More specifically, the instructions may cause various data manipulations on data stored in storage 134, e.g., and without limitation, create, read, update, and delete procedures. Upon initiation of a computer-based method, various instructions may be executed during initialization. Some operations may be required in order to perform one or more processes described herein, while other operations may be more general and/or specific to a particular programming language e.g., and without limitation, C, C#, C++, Java, or other suitable programming languages, etc.

Processor 105 is operatively coupled to a communication interface 115 such that server system 101 is capable of communicating with a remote device such as a user system or another server system 101. For example, communication interface 115 may receive communications from user computing devices via the Internet. Processor 105 is also operatively coupled to an input/output interface 135 that connects to one or more input/output devices used by a user to control operation of server system 101. Input/output devices may include, without limitation, one or more of a keyboard, mouse, microphone, touchpad, keypad, stylus, speakers, or any device configured to provide user input to a human user and transmit output. Processor 105 is also operatively coupled to a display processing component 140 and a display interface 145.

In one embodiment, display processing component 140 is a dedicated computer processor for image processing and rendering tasks, e.g., and without limitation, a graphics processing pipeline. Display interface 145 represents any display device used to render images for viewing by user, including, and without limitation, computer monitors, mobile device screens, touch-enabled screens, LCD displays, TFT displays, dot-matrix displays, and the like. Processor 105 is configured to send some or all of its image processing tasks to display processing component 140, receive processed images to display processing component 140, and display the processed images via display interface 145 to a user.

Processor 105 may also be operatively coupled to a storage device 134. Storage device 134 is any computer-operated hardware suitable for storing and/or retrieving data. In some embodiments, storage device 134 is integrated in server system 101. In other embodiments, storage device 134 is external to server system 101 and is similar to database 120 (shown in FIG. 1). For example, server system 101 may include one or more hard disk drives as storage device 134. In other embodiments, storage device 134 is external to server system 101 and may be accessed by a plurality of server systems 101. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 105 is operatively coupled to storage device 134 via a storage interface 120. Storage interface 120 is any component capable of providing processor 105 with access to storage device 134. Storage interface 120 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 105 with access to storage device 134.

Memory area 110 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 2:
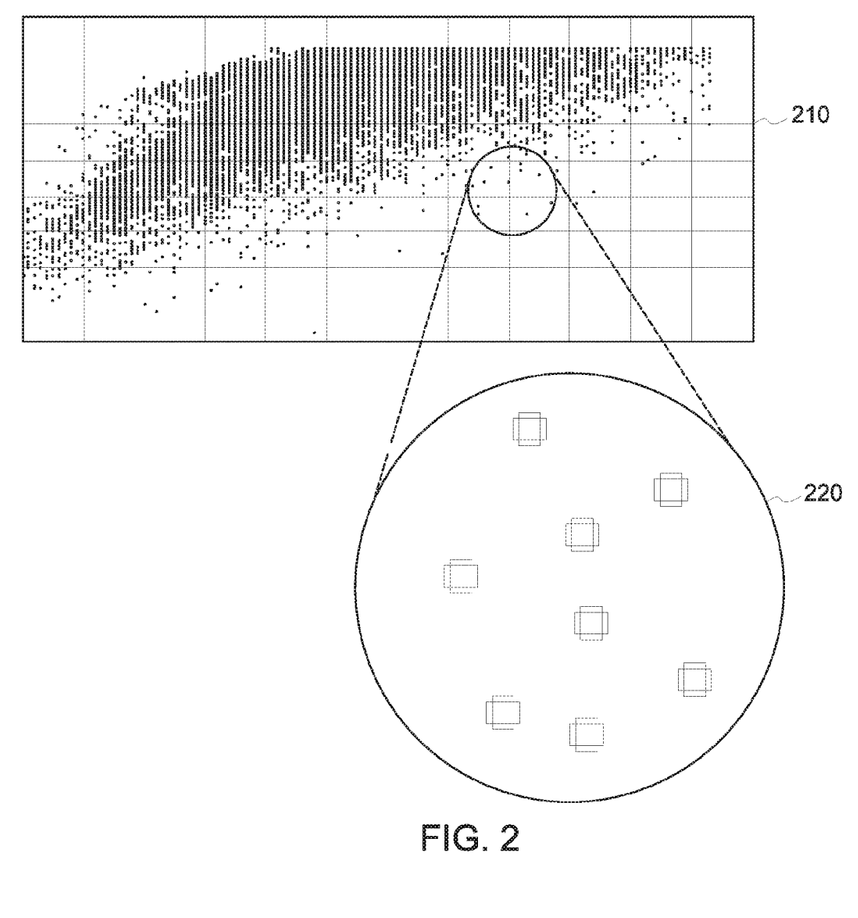
FIG. 2 shows an exemplary rendering of a large dataset, with a zoomed-in area showing how individual data points are rendered by the GPO computing device shown in FIG. 1.

FIG. 2 shows an exemplary rendering of a large dataset, with a zoomed-in area showing how individual data points are rendered. A screen 210 represents a computer display on which a large number of data points have been rendered, where each point on the display represents an individual data point, e.g., engine temperature for an aircraft engine. Inset 220 displays a zoomed-in version of screen 210, showing a plurality of individual data points, represented as solid circles. In known systems, it becomes cumbersome to quickly display such a massive quantity of data points as displayed on screen 210. However, the GPO computing device disclosed here is configured to determine the number of display pixels on screen 210 and efficiently and quickly display all data points for screen 210. In one embodiment, the stored dataset is configured such that each engine temperature value must be rendered as a five pointed star.

In known methods, a graphics processing unit would need to determine the area and/or circumference of each circle, determine the center of the circle for each data point, determine which pixels correspond to that area or circumference and cause a display to render or "light up" those pixels around the determined center. These steps employ valuable computing power that is quickly exhausted as a large dataset is rendered. By contrast, in one embodiment, the GPO computing device is configured to interpret each data point not as a circle but as one or more rectangles. The rectangles are arranged such that they appear as a circle at the resolution and viewing distance normally used by a human user. The GPO computing device is configured to convert the circle to one or more rectangles using image transformations described in more detail below. This is similar to the Zukowsky transformation used in fluid mechanics to simplify the mathematics of fluid flow around complex shapes.

Figure 3:
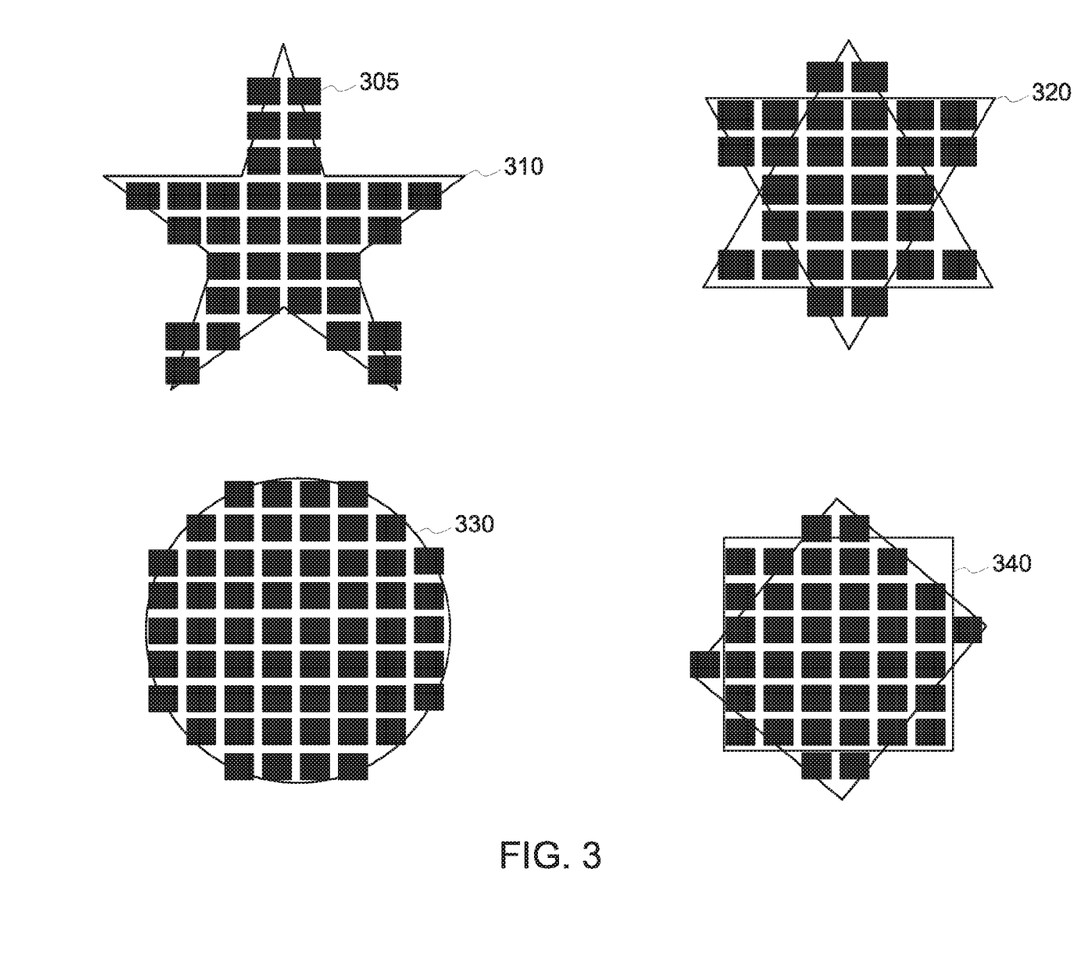
FIG. 3 shows in more detail how the GPO computing device shown in FIG. 1 transforms input shapes into output shapes which are more efficient to render.

FIG. 3 shows in more detail how the GPO computing device transforms input shapes, e.g., stars or circles, into output shapes, e.g., groups of triangles or rectangles, which are more efficient to render. As shown, shape 310 represents a five-pointed star. Shape 320 represents a pair of superimposed triangles 320 that are intended to represent the same data point that is associated with the star in shape 310. Similarly, shape 330 represents a circle. Shape 340 represents a pair of superimposed rectangles 340 that are intended to represent the same data point that is associated with the circle in shape 310. For each of shapes 310, 320, 330, and 340, a plurality of black squares represent pixels 305. In one embodiment, pixels 305 represent pixels on a computer display that are used to render shapes 310, 320, 330, and 340. When a computer processor directs a display device to render an image, a particular set of pixels is activated or switched on using a set of display instructions in order to render the image. Display instructions may include instructions relating to pixel color, light intensity, hue, pitch, and the like.

In one embodiment, the GPO computing device is configured to receive a subset of a large dataset to be visualized and parse through the subset to determine a preferred display for each data point in the subset. For example, the subset may include data type A and data type B, rendered using a star and a circle respectively. The GPO computing device is configured to determine that data type A will be rendered using a pair of superimposed triangles as shown by shape 320 and that data type B will be rendered using a pair of superimposed rectangles as shown by shape 340. At a viewing distance for a human user of the GPO computing device, shape 310 can be efficiently rendered as shape 320.

FIG. 3 also shows that the GPO computing device is configured to determine output shapes that require as few pixels as possible while still maintaining a predetermined size. FIG. 3 shows an overlay of pixels on each of shapes 310, 320, 330, and 340, represented as solid black squares. Accordingly, shape 310 requires at least 30 pixels to display. To create a corresponding shape of comparable size, the GPO computing device is configured to generate a display of two superimposed triangles as in shape 320 such that it requires only 23 pixels to display. Similarly, the circle in shape 330 requires at least 60 pixels to display. To create a corresponding shape of comparable size, the GPO computing device is configured to generate a display of two superimposed rectangles as in shape 340 such that it requires only 41 pixels to display. At a viewing distance for a human user of the GPO computing device, shape 330 can be efficiently rendered as shape 340.

Figure 4:
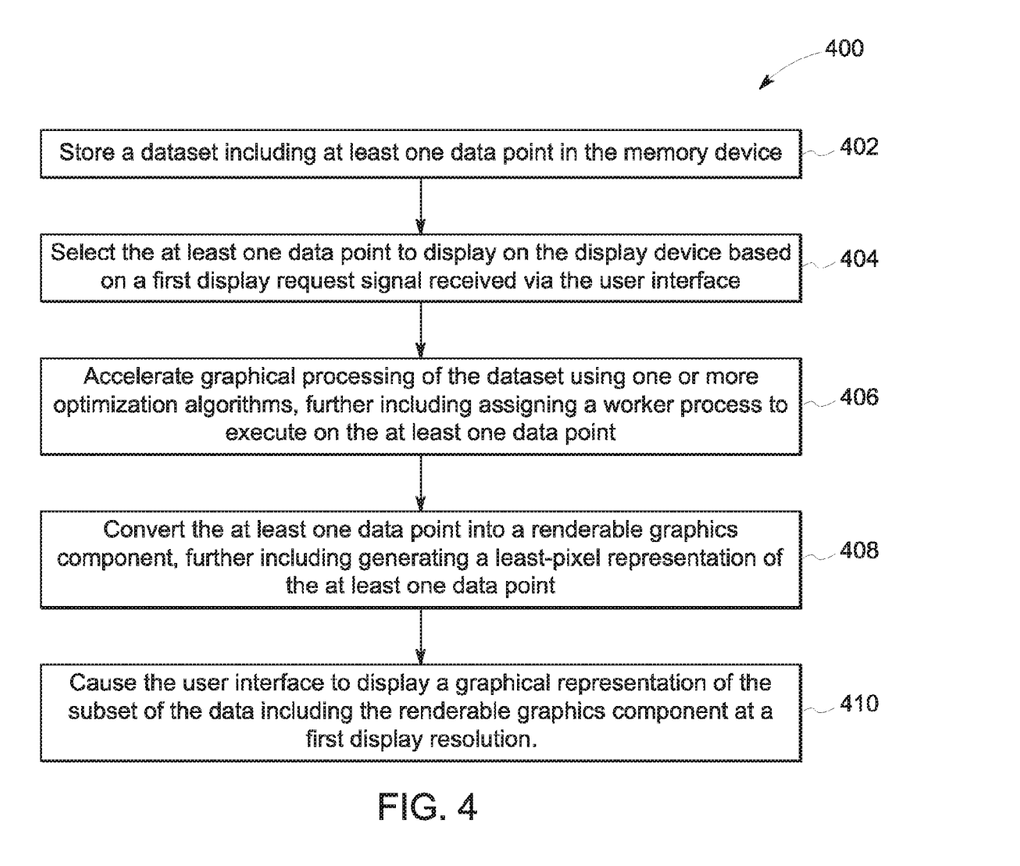
FIG. 4 shows an exemplary method by which the GPO computing device shown in FIG. 1 generates rapid visualizations of large datasets.

FIG. 4 shows an exemplary method 400 by which GPO computing device 100 generates rapid visualizations of large datasets. In one embodiment, GPO computing device 100 shown in FIG. 1 is coupled to memory device 134, display device 145, and user interface 135 (all shown in FIG. 1) used for input. GPO computing device 100 is configured to store 402 a dataset including at least one data point in memory device 134. For example, the dataset may include a large number of engine temperature values corresponding to an aircraft engine operating over time. Each data point represents a temperature value. Each data point is also represented by some shape, graphic, or other display system stored within the dataset. A user requests visualization of the dataset via user interface 135. GPO computing device 100 selects 404 the data point to display on display device 145 based on a first display request signal received via the user interface.

GPO computing device 100 is configured to accelerate 406 graphical processing of the dataset using one or more optimization algorithms. The acceleration process at 406 also includes GPO computing device 100 assigning a worker process to execute on the data point. In one embodiment, a worker processor is a hardware component subsidiary to or just in communication with the GPO computing device such that the worker processor operates based on commands received from the GPO computing device. In another embodiment, a worker processor is, e.g., and without limitation, a virtual machine, a code routine, an application, an applet, an operating system process, and the like.

GPO computing device 100 transforms the display image associated with the data point into a target image that is rendered more efficiently. To accomplish this, GPO computing device 100 converts 408 the data point into the target image (also called a renderable graphics component). This includes generating a least-compute-intensive, e.g., least-pixel, representation of the data point. As a subsidiary step, GPO computing device 100 is configured to select, from one or more least-pixel representations, the one that would best fit the display image associated with the data point. For example, the dataset may store the data point as a star. GPO computing device 100 determines that a pair of superimposed triangles best represents a star at human-viewable resolutions and transforms the star into the pair of superimposed triangles. Post-transformation, GPO computing device 100 causes 410 the display interface to display a graphical representation of the subset of the data including the renderable graphics component at a certain display resolution.

Figure 5:
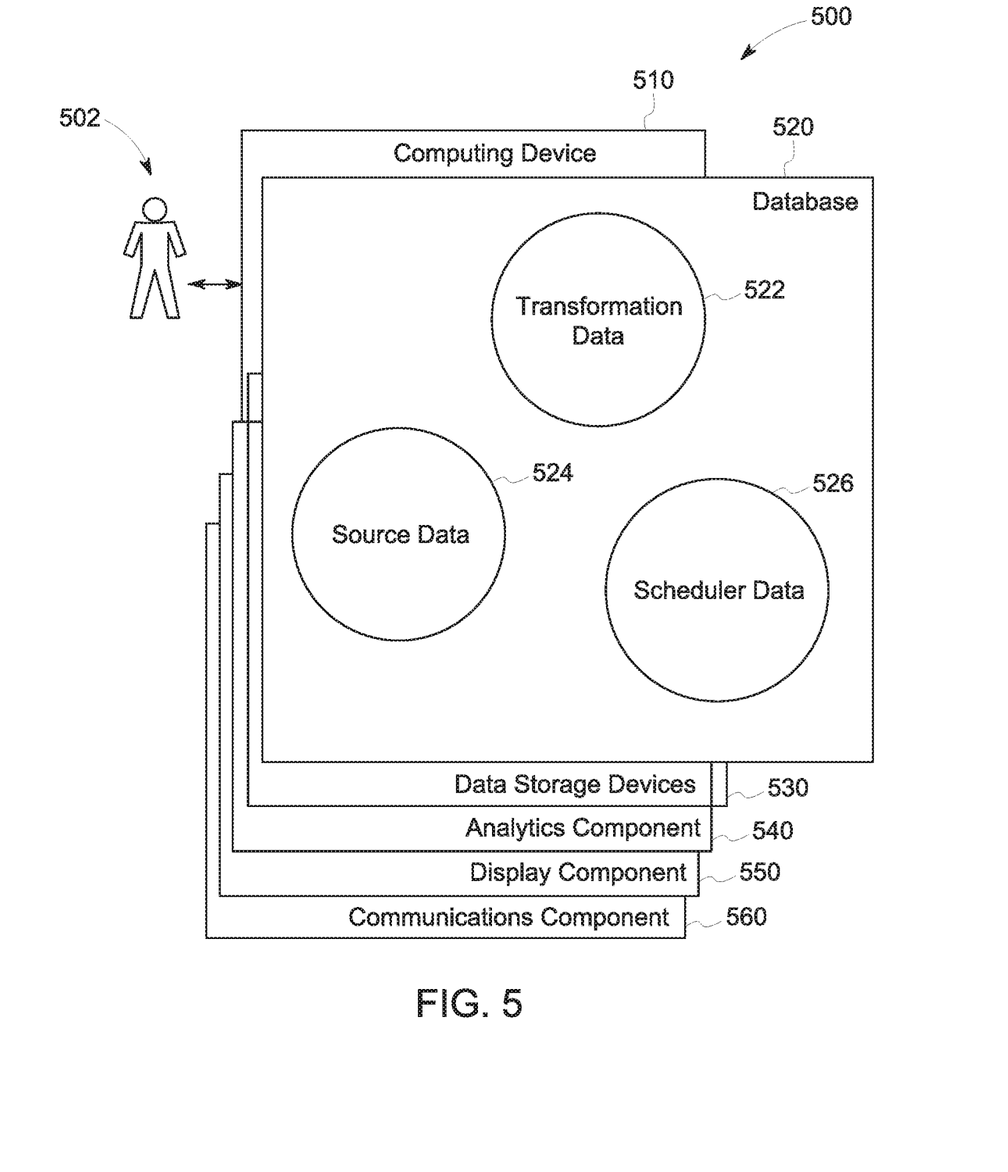
FIG. 5 shows an exemplary configuration of a database within the GPO computing device shown in FIG. 1, along with other related computing components, that may be used to generate rapid visualizations of large datasets.

FIG. 5 shows an exemplary configuration of a database 500 within a computing device, along with other related computing components, that may be used to generate rapid visualizations of large datasets. In some embodiments, computing device 510 is similar to GPO computing device 100 (shown in FIG. 1). User 502 (such as an owner of a component) may access computing device 510 in order to predict the service life decrease for a component. In some embodiments, database 520 is similar to storage device 134 (shown in FIG. 1). In the example embodiment, database 520 includes transformation data 522, source data 524, and scheduler data 526. Transformation data 522 includes data regarding image transformations used to convert stored display images into renderable graphics components. Transformation data 522 includes algorithms designed to perform the transformations.

Source data 524 includes the large datasets that contain the actual data points that will be displayed using GPO computing device 100. For example, source data 524 may include test data, statistics, infographics, or any dataset that may be requested for display on a user device. Scheduler data 526 includes scheduling algorithms that are employed to schedule the various worker processes when rendering visualizations for datasets in source data 524. For example, a scheduling algorithm may direct GPO computing device 100 to slow down or stop the visualization when another incoming request for CPU processing capacity is received.

Computing device 510 also includes data storage devices 530. Computing device 510 also includes analytics component 540 that uses scheduler data 524 and transformation data 522 to process visualizations for source data 524. Computing device 510 also includes display component 550 that receives data from analytics component 540 and converts it into various formats in order to provide visualizations compatible with a variety of user computing devices. Computing device 510 also includes communications component 560 which is used to communicate with user computing devices using predefined network protocols such as TCP/IP (Transmission Control Protocol/Internet Protocol) over the Internet.

The methods and systems described herein may be implemented using computer programming or engineering techniques including computer software, firmware, hardware, or any combination or subset thereof, where the technical effects may be achieved by performing at least one of the following steps: (a) store a dataset including at least one data point in the memory device (b) select the at least one data point to display on the display device based on a first display request signal received via the user interface, (c) accelerate graphical processing of the dataset using one or more optimization algorithms, including assigning a worker process to execute on the at least one data point, (d) convert the at least one data point into a renderable graphics component, including generating a least-pixel representation of the at least one data point, and (e) cause the user interface to display a graphical representation of a first subset of the data including the renderable graphics component at a first display resolution.

The above-described graphics processing and optimization systems and methods overcome a number of deficiencies associated with known systems and methods of graphics processing. Specifically, the above-described systems and methods enable rapid visualization of very large datasets without use of massive amounts of computer processing power. Unlike some known methods, large datasets can be visualized using even a single computer processor, and computer processes are scheduled such that while a large dataset is being displayed, user inputs, e.g., mouse moves are continuously detected and processed rather than allowing these user inputs to overwhelm and lock the computer processor.

An exemplary technical effect of the methods, systems, and apparatus described herein includes at least one of: (i) enhancing the ability of a computer processor to process and display a very large dataset; (ii) augmented use of image transformation algorithms to accelerate display of large datasets; (iii) implementing improved methods of computer processor scheduling leading to decreased processor lockup; and (iv) enabling a display-capacity-driven processing of data visualizations by processing data based on how much of the dataset can display at any given time.

Exemplary embodiments of graphics processing and optimization devices are described above in detail. The graphics processing and optimization devices, and methods of operating such systems and devices are not limited to the specific embodiments described herein, but rather, components of systems and/or steps of the methods may be utilized independently and separately from other components and/or steps described herein. For example, the systems, apparatus, and methods may also be used in combination with other systems requiring accelerated graphics or image processing capabilities, and are not limited to practice with only the facilities, systems and methods as described herein. Rather, the exemplary embodiment can be implemented and utilized in connection with many other graphics applications that are configured to render computer images, e.g., and without limitation, graphics processing pipeline software systems, image manipulation software systems, and the like.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for optimizing processing and display of datasets, the system comprising:
    a memory device;
    a user interface comprising a display device; and
    a graphics processing and optimization (GPO) computing device coupled with said memory device and communicatively coupled to said user interface, wherein said GPO computing device is configured to:
        store a dataset comprising at least one data point in said memory device;
        select the at least one data point to display on said display device based on a first display request signal received from said user interface;
        accelerate graphical processing of the dataset using one or more optimization algorithms, wherein said GPO computing device is configured to assign a worker process to execute on the at least one data point;
        convert a display image having any geometric shape associated with the at least one data point into a renderable graphics component, including selecting a least-pixel representation of the at least one data point that best fits the display image associated with the at least one data point from one or more least-pixel representations, wherein the least-pixel representation is selected from transformation data stored in the dataset in said memory device; and
        display a graphical representation of a first subset of the dataset including the renderable graphics component at a first display resolution on said display device.

2. The system in accordance with claim 1, wherein said GPO computing device is further configured to:
    receive a second display request signal via said user interface, wherein the second display request signal includes an instruction to display at least one other data point;
    reassign the worker process to execute on the at least one other data point; and
    display a second subset of the dataset including the at least one other data point.

3. The system in accordance with claim 1, wherein said GPO computing device is further configured to:
    determine one or more neighboring data points adjacent to the at least one data point;
    generate a graphic representation of the one or more neighboring data points; and
    display the graphic representation at a second resolution that is lower than the first resolution.

4. The system in accordance with claim 1, wherein said GPO computing device is further configured to store a process state corresponding to the first subset in said memory device for the worker process when the worker process is assigned to the first subset.

5. The system in accordance with claim 4, wherein said GPO computing device is configured to apply the process state to the worker process in each instance that the worker process executes on the first subset.

6. A system in accordance with claim 5, wherein the least-pixel representation comprises a pixel count and a relative orientation for each pixel.

7. The system in accordance with claim 1, wherein said GPO computing device is further configured to apply at least one display template to the processed dataset.

8. The system in accordance with claim 1, wherein the output shape requires fewer pixels than the input shape while still maintaining a predetermined size.

9. The system in accordance with claim 1, wherein the input shape comprises a circle shape and the output shape comprises a pair of superimposed rectangles in a particular offset configuration.

10. The system in accordance with claim 1, wherein the input shape comprises a star shape and the output shape comprises a pair of superimposed triangles that are intended to represent the same data point that is associated with the star shape.

11. A method for optimizing processing and display of datasets, the method implemented using a graphics processing and optimization (GPO) computing device in communication with a memory device and a processor, said method comprising:
    storing, by the GPO computing device, a dataset comprising at least one data point in said memory device;
    selecting, by the GPO computing device, the at least one data point to display on a display device based on a first display request signal received from a user interface;
    accelerating, by the GPO computing device, graphical processing of the dataset using one or more optimization algorithms, further comprising assigning a worker process to execute on the at least one data point;
    converting, by the GPO computing device, a display image having any geometric shape associated with the at least one data point into a renderable graphics component, including selecting a least-pixel representation of the at least one data point that best fits the display image associated with the at least one data point from one or more least-pixel representations, wherein the least-pixel representation is selected from transformation data stored in the dataset in said memory device; and
    displaying, by the GPO computing device, a graphical representation of a first subset of the dataset including the renderable graphics component at a first display resolution on said display device.

12. The method in accordance with claim 11 further comprising:
   receiving a second display request signal via said user interface, wherein the second display request signal includes an instruction to display at least one other data point;
   reassigning the worker process to execute on the at least one other data point; and
   displaying a second subset of the dataset including the at least one other data point.

13. The method in accordance with claim 11 further comprising:
   determining one or more neighboring data points adjacent to the at least one data point;
   generating a graphic representation of the one or more neighboring data points; and
   displaying the graphic representation at a second resolution that is lower than the first resolution.

14. The method in accordance with claim 11 further comprising storing a process state corresponding to the first subset in said memory device for the worker process when the worker process is assigned to the first subset.

15. The method in accordance with claim 14 further comprising applying the process state to the worker process in each instance that the worker process executes on the first subset.

16. The method in accordance with claim 11 wherein the least-pixel representation comprises a pixel count and a relative orientation for each pixel.

17. The method in accordance with claim 11 further comprising applying at least one display template to the processed dataset.

18. A tangible and non-transitory computer readable medium having computer executable instructions thereon for enhancing processing and display of datasets, wherein when executed by a graphics processing and optimization (GPO) computing device comprising a processor in communication with a memory device, the computer executable instructions cause the GPO computing device to:
   store a dataset comprising at least one data point in the memory device;
   select the at least one data point to display on the display device based on a first display request signal received from a user interface;
   accelerate graphical processing of the dataset using one or more optimization algorithms, wherein the computer-executable instructions further cause the GPO computing device to assign a worker process to execute on the at least one data point;
   convert a display image having any geometric shape associated with the at least one data point into a renderable graphics component, including selecting a least-pixel representation of the at least one data point that best fits the display image associated with the at least one data point from one or more least-pixel representations, wherein the least-pixel representation is selected from transformation data stored in the dataset in the memory device; and
   display a graphical representation of a first subset of the dataset including the renderable graphics component at a first display resolution on said display device.

19. The tangible and non-transitory computer readable medium in accordance with claim 18, wherein the computer-executable instructions further cause the GPO computing device to:
   receive a second display request signal via the user interface, wherein the second display request signal includes an instruction to display at least one other data point;
   reassign the worker process to execute on the at least one other data point; and
   display a second subset of the dataset including the at least one other data point.

20. The tangible and non-transitory computer readable medium in accordance with claim 18, wherein the computer-executable instructions further cause the GPO computing device to:
   determine one or more neighboring data points adjacent to the at least one data point;
   generate a graphic representation of the one or more neighboring data points; and
   display the graphic representation at a second resolution that is lower than the first resolution.

21. The tangible and non-transitory computer readable medium in accordance with claim 18, wherein the computer-executable instructions further cause the GPO computing device to store a process state corresponding to the first subset in the memory device for the worker process when the worker process is assigned to the first subset.

22. The tangible and non-transitory computer readable medium in accordance with claim 21, wherein the computer-executable instructions further cause the GPO computing device to apply the process state to the worker process in each instance that the worker process executes on the first subset.

23. The tangible and non-transitory computer readable medium in accordance with claim 18, wherein the least-pixel representation comprises a pixel count and a relative orientation for each pixel.

24. The tangible and non-transitory computer readable medium in accordance with claim 18, wherein the computer-executable instructions further cause the GPO computing device to apply at least one display template to the processed dataset.

* * * * *